(12) United States Patent
Shreve et al.

(10) Patent No.: US 12,475,649 B2
(45) Date of Patent: Nov. 18, 2025

(54) METHOD AND SYSTEM FOR FACILITATING GENERATION OF BACKGROUND REPLACEMENT MASKS FOR IMPROVED LABELED IMAGE DATASET COLLECTION

(71) Applicant: Palo Alto Research Center Incorporated, Palo Alto, CA (US)

(72) Inventors: Matthew A. Shreve, Campbell, CA (US); Robert R. Price, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 351 days.

(21) Appl. No.: 18/099,186

(22) Filed: Jan. 19, 2023

(65) Prior Publication Data

US 2024/0249476 A1    Jul. 25, 2024

(51) Int. Cl.
*G06T 17/20* (2006.01)
*G06T 15/04* (2011.01)
*H04N 19/17* (2014.01)

(52) U.S. Cl.
CPC ............ *G06T 17/205* (2013.01); *G06T 15/04* (2013.01); *H04N 19/17* (2014.11)

(58) Field of Classification Search
None
See application file for complete search history.

(56) References Cited

U.S. PATENT DOCUMENTS

| | | | |
|---|---|---|---|
| 8,200,011 B2 * | 6/2012 | Eaton | G06V 40/20 382/173 |
| 10,147,023 B1 | 12/2018 | Klaudiny | |
| 10,229,539 B2 | 3/2019 | Shikoda | |
| 10,304,159 B2 | 5/2019 | Aoyagi | |
| 10,366,521 B1 | 7/2019 | Peacock | |
| 11,256,958 B1 | 2/2022 | Subbiah | |
| 11,527,064 B1 * | 12/2022 | Croston | G06V 10/235 |
| 2008/0189083 A1 | 8/2008 | Schell | |
| 2010/0040272 A1 | 2/2010 | Zheng | |
| 2012/0117072 A1 * | 5/2012 | Gokturk | G06F 16/954 707/E17.089 |

(Continued)

OTHER PUBLICATIONS

Kevin Lai et al., "A Large-Scale Hierarchical Multi-View RGB-D Object Dataset", Robotics and Automation (ICRA), 2011 IEEE International Conferene on, IEEE, May 9, 2011, pp. 1817-1824. *abstract* *Section IV* *Figure 6*.

(Continued)

*Primary Examiner* — Sultana M Zalalee

(57) ABSTRACT

A system captures, by a recording device, a scene with physical objects, the scene displayed as a three-dimensional (3D) mesh. The system marks 3D annotations for a physical object and identifies a mask. The mask indicates background pixels corresponding to a region behind the physical object. Each background pixel is associated with a value. The system captures a plurality of images of the scene with varying features, wherein a respective image includes: two-dimensional (2D) projections corresponding to the marked 3D annotations for the physical object; and the mask based on the associated value for each background pixel. The system updates the value of each background pixel with a new value. The system trains a machine model using the respective image as generated labeled data, thereby obtaining the generated labeled data in an automated manner based on a minimal amount of marked annotations.

20 Claims, 8 Drawing Sheets

(4 of 8 Drawing Sheet(s) Filed in Color)

(56) References Cited

U.S. PATENT DOCUMENTS

| | | | |
|---|---|---|---|
| 2012/0200601 A1 | 8/2012 | Osterhout | |
| 2013/0127980 A1 | 5/2013 | Haddick | |
| 2015/0037775 A1 | 2/2015 | Ottensmeyer | |
| 2016/0260261 A1 | 9/2016 | Hsu | |
| 2016/0292925 A1 | 10/2016 | Montgomerie | |
| 2016/0328887 A1 | 11/2016 | Elvezio | |
| 2016/0335578 A1 | 11/2016 | Sagawa | |
| 2016/0349511 A1 | 12/2016 | Meiron | |
| 2017/0304732 A1* | 10/2017 | Velic | G06V 10/774 |
| 2017/0366805 A1 | 12/2017 | Sevostianov | |
| 2018/0035606 A1 | 2/2018 | Burdoucci | |
| 2018/0204160 A1 | 7/2018 | Chehade | |
| 2018/0315329 A1 | 11/2018 | D'Amato | |
| 2018/0336732 A1 | 11/2018 | Schuster | |
| 2019/0130219 A1* | 5/2019 | Shreve | G06T 19/006 |
| 2019/0156202 A1 | 5/2019 | Falk | |
| 2019/0196698 A1* | 6/2019 | Cohen | G10L 15/22 |
| 2019/0362556 A1 | 11/2019 | Ben-Dor | |
| 2020/0013219 A1* | 1/2020 | Dhua | G06T 7/12 |
| 2020/0081249 A1 | 3/2020 | Brusnitsyn | |
| 2020/0210780 A1 | 7/2020 | Torres | |
| 2020/0364878 A1* | 11/2020 | Bradski | G06N 3/084 |
| 2021/0233308 A1* | 7/2021 | Barasofsky | G06T 17/20 |
| 2021/0243362 A1 | 8/2021 | Castillo | |
| 2021/0342600 A1* | 11/2021 | Westmacott | G06F 18/2148 |
| 2021/0350588 A1 | 11/2021 | Tanida | |
| 2022/0262008 A1* | 8/2022 | Kidd | G06F 18/214 |
| 2022/0270265 A1* | 8/2022 | Dudovitch | G06F 3/04845 |
| 2022/0417532 A1* | 12/2022 | Turbell | G06T 7/11 |
| 2023/0123749 A1* | 4/2023 | Österberg | A01G 23/00 345/419 |
| 2024/0046568 A1* | 2/2024 | Shreve | G06T 17/20 |

OTHER PUBLICATIONS

Georgios Georgakis et al., "Multiview RGB-D Dataset for Object Instance Detection", 2016 Fourth International Conference on 3D Vision (3DV), Sep. 26, 2016, pp. 426-434. *Abstract* *Section 3*.

Aldoma Aitor et al., "Automation of "Ground Truth" Annotation for Multi-View RGB-D Object Instance Recognition Datasets", 2014 IEEE/RSJ International Conference on Intelligent Robots and Systems, IEEE, Sep. 14, 2014, pp. 5016-5023. *abstract* *Section III*.

Pat Marion et al., "LabelFusion: A Pipeline for Generating Ground Truth Labels for Real RGBD Data of Cluttered Scenes", Jul. 15, 2017, retrieved form the Internet: URL: https://arxiv.org/ pdf/1707.04796.pdf. *abstract* *Section 111*.

Alhaija et al., "Augmented Reality Meets Computer Vision: Efficient Data Generation for Urban Driving Scenes", Aug. 4, 2017.

Kaiming He, Georgia Gkioxari, Piotr Dollar Ross Girshick, "Mask R-CNN", arXiv:1703.06870v1 [cs.CV] Mar. 20, 2017.

Umar Iqbal, Anton Milan, and Juergen Gall, "PoseTrack: Joint Multi-Person Pose Estimation and Tracking", arXiv:1611.07727v3 [ cs.CV] Apr. 7, 2017.

Ohan Oda, etal.; "Virtual replicas for remote assistance in virtual and augmented reality", Proceedings of the 28th Annual ACM Symposium on User Interface Software & Technology, Nov. 8-11, 2015, Charlotte, NC, pp. 405-415 (Year: 2015).

Mueller, How To Get Phone Notifications When Your Brother HL-3170CDW Printer Runs Out Of Paper, https://web.archive.org/web/20180201064332/http://www.shareyourrepair.com/2014/12/how-to-get-push-notifications-from-brother-printers-with-gmail-boxcar.html (Year: 2018).

Epson Printer Says Out of Paper but It Isn't, https://smartprintsupplies.com/blogs/news/ p-strong-epson-printer-says-out-of-paper-but-it-isnt-strong-p-p-p (Year: 2018).

Adepu et al. Control Behavior Integrity for Distributed Cyber-Physical Systems (Year: 2018).

Khurram Soomro "UCF101: A Dataset of 101 Human Actions Classes From Videos in The Wild" Dec. 2012.

J. L. Pech-Pacheco et al "Diatom autofocusing in brightheld microscopy: a comparative study" IEEE 2000.

Said Pertuz et al "Analysis of focus measure operators in shape-from-focus", Research gate Nov. 2012, Article Accepted Nov. 7, 2012, Available priline Nov. 16, 2012.

* cited by examiner

METHOD AND SYSTEM FOR FACILITATING GENERATION OF BACKGROUND REPLACEMENT MASKS FOR IMPROVED LABELED IMAGE DATASET COLLECTION

RELATED APPLICATION

This application is related to:

U.S. Pat. No. 10,699,165, entitled "SYSTEM AND METHOD USING AUGMENTED REALITY FOR EFFICIENT COLLECTION OF TRAINING DATA FOR MACHINE LEARNING," by inventors Matthew A. Shreve, Sricharan Kallur Palli Kumar, Jin Sun, Gaurang R. Gavai, Robert R. Price, and Hoda M. A. Eldardiry, filed 29 Nov. 2017 and issued 30 Jun. 2020 (hereinafter "U.S. Pat. No. 10,699,165"), and U.S. Pat. No. 11,200,457, entitled "SYSTEM AND METHOD USING AUGMENTED REALITY FOR EFFICIENT COLLECTION OF TRAINING DATA FOR MACHINE LEARNING," by inventors Matthew A. Shreve, Sricharan Kallur Palli Kumar, Jin Sun, Gaurang R. Gavai, Robert R. Price, and Hoda M. A. Eldardiry, filed 23 Apr. 2020 and issued 14 Dec. 2021 (hereinafter "U.S. Pat. No. 11,200,457"), where U.S. Pat. Nos. 10,699,165 and 11,200,457 claim the benefit and priority of U.S. Provisional Application No. 62/579,000, entitled "SYSTEM AND METHOD USING AUGMENTED REALITY FOR EFFICIENT COLLECTION OF TRAINING DATA FOR MACHINE LEARNING," by inventors Matthew A. Shreve, Sricharan Kallur Palli Kumar, Jin Sun, Gaurang R. Gavai, Robert R. Price, and Hoda M. A. Eldardiry, filed 30 Oct. 2017;

U.S. application Ser. No. 17/840,358, entitled "SYSTEM AND METHOD FOR INTERACTIVE FEEDBACK IN DATA COLLECTION FOR MACHINE LEARNING IN COMPUTER VISION TASKS USING AUGMENTED REALITY," by inventors Matthew A. Shreve and Robert R. Price, filed 14 Jun. 2022 (hereinafter "U.S. patent application Ser. No. 17/840,358"); and U.S. application Ser. No. 17/879,480, entitled "METHOD AND SYSTEM FOR MIXING STATIC SCENE AND LIVE ANNOTATIONS FOR EFFICIENT LABELED IMAGE DATASET COLLECTION," by inventors Matthew A. Shreve and Jeyasri Subramanian, filed 2 Aug. 2022 (hereinafter "U.S. patent application Ser. No. 17/879,480");

the disclosures of which are incorporated by reference herein.

BACKGROUND

Field

This disclosure is generally related to computer vision systems. More specifically, this disclosure is related to a method and system for facilitating generation of background replacement masks for improved labeled image dataset collection.

Related Art

Currently, in machine learning and computer vision systems, a common approach in creating datasets for novel objects involves deploying human technicians to the field to capture images of objects from different poses and under different lighting conditions, or to crowd source images obtained from clients or public sources. Upon obtaining these images (which may comprise a significant number of images in a large database), human labelers may manually label each individual image (e.g., by drawing a bounding box around the object or by using an annotation tool). Given the intensive nature of the labeling process, such a task may require a significant number of human-hours. While some existing tools may improve this process, the challenge remains to provide improvements and a significant reduction in the number of human-hours necessary in collecting and creating labeled training data.

SUMMARY

One embodiment provides a system which facilitates generation of background replacement masks for improved labeled image dataset collection. During operation, the system captures, by a recording device, a scene with a plurality of physical objects, wherein the scene is displayed as a three-dimensional (3D) mesh. The system marks 3D annotations for a physical object in the scene. The system identifies a mask in the scene, wherein the mask indicates background pixels corresponding to a region behind the physical object and each background pixel is associated with a value. The system captures a plurality of images of the scene with varying features, wherein a respective image includes: two-dimensional (2D) projections corresponding to the marked 3D annotations for the physical object; and the mask based on the associated value for each background pixel. The system updates, in the respective image, the value of each background pixel with a new value. The system trains a machine model using the respective image as generated labeled data, thereby obtaining the generated labeled data in an automated manner based on a minimal amount of marked annotations.

In some embodiments, identifying the mask further comprises at least one of: inserting, by a user associated with the recording device, the mask in the scene using tools associated with the recording device or another computing device; and detecting, automatically by the recording device, predetermined categories of 2D surfaces or 3D surfaces or shapes.

In some embodiments, the mask comprises a virtual green screen, and the value associated with each background pixel comprises a chroma key value corresponding to a shade of green.

In some embodiments, the mask corresponds to at least one of: a 2D surface within the 3D mesh scene that is behind or underneath the physical object relative to the recording device; and a 3D surface or shape within the 3D mesh scene that is behind or underneath the physical object relative to the recording device.

In some embodiments, the varying features of the captured plurality of images of the scene include or are based on at least one of: a location, pose, or angle of the recording device relative to the physical object; a lighting condition associated with the scene; and an occlusion factor of the physical object in the scene.

In some embodiments, the value associated with each background pixel comprises at least one of: a chroma key value; a red green blue (RGB) value; a hue saturation value (HSV) value; a hue saturation brightness (HSB) value; a monochrome value; a random value; a noisy value; and a value or flag indicating that a respective background pixel of the mask is to be subsequently replaced by a pixel with a different value.

In some embodiments, a respective background pixel is of a same or a different value than a remainder of the background pixels.

In some embodiments, updating the value of each background pixel with the new value comprises at least one of: replacing the background pixels indicated by the mask with a natural image, wherein the natural image comprises a differing texture from the region behind the physical object; and replacing the background pixels indicated by the mask with pixels of a same value or a different value as each other.

In some embodiments, the system stores an image of the scene, including the marked 3D annotations and the identified mask, captured by the recording device. The system stores the respective image, including the 2D projections and the mask, captured by the recording device. The system stores the respective image with the updated background pixels

BRIEF DESCRIPTION OF THE FIGURES

The patent or application file contains at least one drawing executed in color. Copies of this patent or patent application publication with color drawing(s) will be provided by the Office upon request and payment of the necessary fee.

In the figures, like reference numerals refer to the same figure elements.

DETAILED DESCRIPTION

Figure 1:
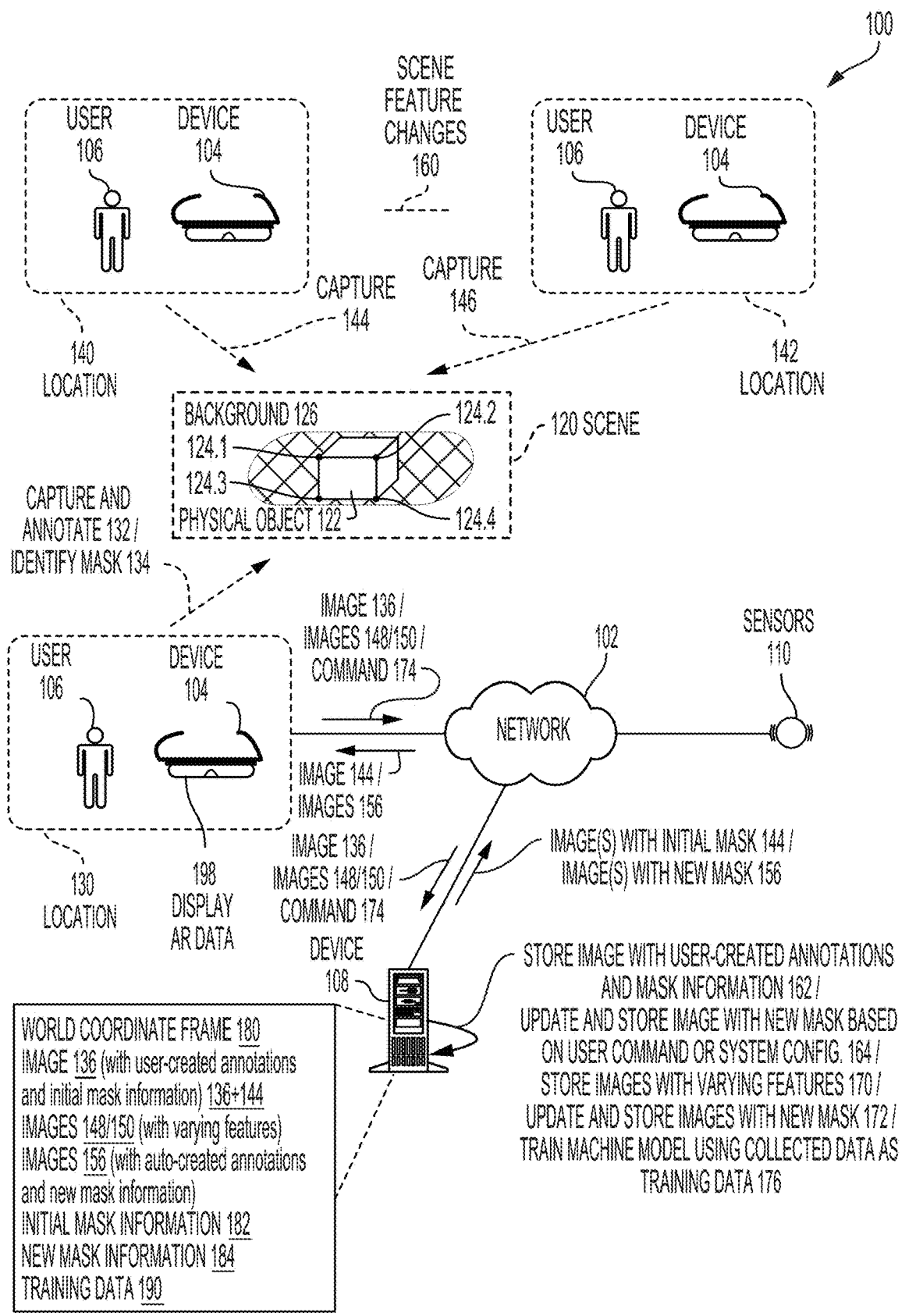
FIG. 1 illustrates an exemplary environment for facilitating generation of background replacement masks for improved labeled image dataset collection, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein provide a system which facilitates generation (manual or automatic) of background replacement masks (e.g., a "virtual green screen") in images of physical objects in a 3D mesh scene.

Currently, in machine learning and computer vision systems, a common approach in creating datasets for novel objects involves deploying human technicians to the field to capture images of objects from different poses and under different lighting conditions, or to crowd source images obtained from clients or public sources. Upon obtaining these images (which may comprise a significant number of images in a large database), human labelers may manually label each individual image (e.g., by drawing a bounding box around the object or by using an annotation tool). Given the intensive nature of the labeling process, such a task may require a significant number of human-hours. While some existing tools may improve this process, the challenge remains to provide improvements and a significant reduction in the number of human-hours necessary in collecting and creating labeled training data.

As an example, in building a robust visual object detector for novel objects or object parts, a technician must capture and label images of an object under a variety of conditions, including, e.g., from different locations (angle and pose), under different lighting conditions, with partial obstructions, and a varying amount of blur. U.S. Pat. Nos. 10,699,165 and 11,200,457 describe a method and system for accelerated labeling of images using projection of 3D labels anchored in a world frame (based on Simultaneous Localization and Mapping (SLAM) techniques) into 2D image frames. The 3D labels may be created by technicians placing a single AR holographic annotation (e.g., a 3D bounding box) over each object in a particular scene, which single annotation is subsequently automatically projected as a 2D image frame or 2D annotations (e.g., a 2D bounding area) to any captured image.

As described in U.S. Pat. Nos. 10,699,165 and 11,200,457, a user can mark annotations on physical objects in a scene as represented by a 3D mesh or an AR world map, e.g., using an AR headset or a tablet while walking or moving around the scene. These annotations in the 3D mesh can be projected as corresponding 2D annotations in subsequent views of the 3D mesh. Images taken of the 3D mesh from the subsequent views can include the projected 2D annotations, which can result in an efficient method and system for collecting additional labeled data.

However, while U.S. Pat. Nos. 10,699,165 and 11,200,457 describe a method and system which allows users to quickly capture labeled data from different perspectives and under different lighting conditions using minimal user annotations, the background of the annotated objects remain fixed. The fixed background can result in overfitting or under-generalization in the models which are trained on the obtained images. For example, if a model is trained on examples of a tea kettle resting on a wooden table, the model may learn to associate the texture of the wooden table with the tea kettle object, which may result in a failure to detect the tea kettle when it is placed on a different surface.

One solution to this challenge is to use a physical green screen for diversifying the backgrounds of images which can be used to train machine models, e.g., object detection systems. However, using physical green screens can result in several limitations. In one limitation, the chroma key value must be matched across the entire surface of the green screen. That is, the value of the color may change due to the environment and uneven lighting conditions as well as through the wear and/or damage to the physical green screen caused by normal usage. In another limitation, light reflectance off the surface of the physical green screen may shift the color of the physical objects sitting on the physical green screen. This may result in inducing bias in the collection of the labeled image dataset. For example, a highly reflective (e.g., metallic, silver, mirrored, clear, transparent, or partially opaque) physical object which is placed on a physical green screen may reflect or display the color of the green screen in certain portions. This can result in those certain portions of the highly reflective physical object being incorrectly treated as part of the green screen, e.g., being removed from the image and replaced by background pixels, as described below. In yet another limitation, a physical green screen must travel to each scene in which user data is to be collected, which can result in a cumbersome and inefficient process. Transporting the physical green screen between various scenes can increase the rate of wear from usage as well as the risk of damage to the physical green screen.

The described embodiments address this challenge by providing a system which can generate a background mask in images of physical objects in a 3D mesh scene captured by an AR device. For example, given a 3D mesh scene with physical objects on a table, the system (or a user) can identify the table as a background region of the table, insert a virtual green screen in place of the table to obtain background pixels, and subsequently replace the background pixels with new backgrounds (e.g., random noise or images collected from other natural scenes). The system can thus efficiently generate images which include the replaced background pixels as well as the marked annotations and projected 2D annotations. These generated images can be used as additional labeled data for training a machine model or other computer vision system.

The system can generate a background mask either by a user manually inserting a 3D surface or a 2D surface or by automatically detecting surfaces which have been semantically categorized (e.g., floors, walls, table-tops, chairs, etc.), as described below in relation to FIGS. 2A, 3A, and 3B). The background mask can be a virtual green screen which is assigned a certain chroma key value, where the chroma key value can be stored for future use, e.g., to subsequently identify and replace pixels with that assigned chroma key value. The background mask can also include a mask that indicates which pixels belong to the virtual green screen, rather than assigning a specific chroma key value to the background pixels. The system can store the mask which indicates the background pixels and can use the stored mask to determine which pixels to replace in subsequent images. Both of these methods can result in the generation of labeled images with different backgrounds, which can aid in the efficient collection of labeled training data.

Thus, the described embodiments provide an improvement to the collection of labeled training data or a labeled image dataset, by allowing a user to: mark annotations for physical objects in a scene as represented by a 3D mesh or an AR world map and view corresponding projected 2D annotations; identify a mask indicating background pixels corresponding to a region behind a physical object or objects of interest; and replace the mask with other backgrounds in subsequently captured images. After marking the annotations and identifying the mask in a single image, the user can capture additional images (e.g., in a video using a recording device). The additional images can include the projected 2D annotations and any number of background masks replacing the area initially identified (by the user or by the system). The system can use these additional images as generated labeled data to train a machine model. These features can result in an improved and more efficient system for obtaining and collecting labeled training data.

Indeed, the described embodiments can result in the generation and collection of a significant number of labeled images based on a "minimal" amount or number of marked annotations. This minimal amount can be based on a predetermined threshold, a predetermined percentage, or a predetermined ratio between an image with marked 3D annotations and a corresponding plurality of generated labeled images.

The term "object" or "physical object" can refer to a material item of interest and can include, e.g., parts, devices, equipment, tools, people, animals, body parts, etc.

The term "scene" can refer to a room, multiple rooms, part of a room, an outdoor location, or other physical area within which physical objects may be placed.

The term "background" can refer to an area or region, either 2D or 3D, in a scene which is located, visibly occurring, or existing behind a physical object in the scene.

The term "computing device" can refer to a device or entity which is capable of being connected to a network. The term "recording device" can refer to a computing device which captures images of an object and a scene to create a 3D mesh or world map of the scene. In this disclosure, a computing device and a recording device may include tools which allow a user to: mark annotations around, on, for, or associated with a physical object in the scene; and identify or select a 2D or 3D background mask which corresponds to a region behind one or more physical objects in a scene. A recording device can include an augmented reality (AR)

device, such as a wearable device or a tablet. Exemplary AR features are described below in relation to FIGS. 2A, 2B, 3A, and 3B.

The term "computing system" can refer to a computing device which is coupled to peripheral input/output (I/O) devices, such as a keyboard, a video monitor or display screen, and a pointing device or mouse.

Exemplary Environment and Flow for Generation of Background Replacement Masks for Improved Labeled Image Dataset Collection FIG. 1 illustrates an exemplary environment 100 for facilitating generation of background replacement masks for improved labeled image dataset collection, in accordance with an embodiment of the present invention. Environment 100 can include: a device 104 and an associated user 106; a device 108; a scene 120 which includes a physical object 122 placed on a background 126 (e.g., a table); and sensors 110. Device 104 can include an augmented reality device (such as a Microsoft HoloLens or a tablet). Physical object 122 can be part of scene 120 which has an associated 3D world coordinate frame. Device 108 can include a server or other computing device which can receive, transmit, and store data, and can perform algorithms to: project vertices into images taken from multiple perspectives in the 3D world coordinate frame; generate background masks; update background masks in images; and train a model. Sensors 110 and other tracking sensors (not shown) can work together with device 104 in a system to capture images, annotate images, determine 3D coordinates, store annotated images, project 2D annotated images, generate background masks, update background masks, and display projected images. Device 104, device 108, and sensors 110 can communicate via a network 102.

User 106 can use device 104 from various locations in scene 120 to capture images and metadata for physical objects of interest in the scene, e.g., physical object 122. In the capturing stage, device 108 can provide immediate online feedback to user 106, with information regarding data coverage on the captured images (e.g., performing a dynamic real-time data coverage analysis and error analysis, which provides various user instructions via the display of recording device 104 for user 106, as described in U.S. patent application Ser. No. 17/840,358).

For example, during operation, user 106 can use device 104 from a first viewpoint (e.g., a location 130) in the 3D world coordinate frame to capture and annotate an image 136 of physical object 122 (function 132). Device 104 may display scene 120 as a 3D mesh. User 106 can annotate image 136 by creating a bounding box or shape around physical object 122 (e.g., as indicated by vertices 124.1, 124.2, 124, 3, and 124.4 and other vertices (not labeled) which are determined based on an AR feature or tool, as described below in relation to FIG. 2A). User 106 can also provide a label for physical object 122 that includes a description of physical object 122 and a current state of physical object 122 (e.g., {Tea Kettle, Closed}). Marking 3D annotations and providing labels for physical objects in a 3D mesh or a 3D world coordinate frame is described in U.S. Pat. Nos. 10,699,165 and 11,200,457.

User 106 can also use device 104 to identify a mask in scene 120, e.g., a background 126 (indicated with a diagonal cross-hatch pattern) which includes background pixels corresponding to a region behind physical object 122 (function 134). User 106 can set the value of the background pixels to any value or to a default value, e.g., a value corresponding to a chroma key value of a shade of green (e.g., a virtual green screen) (not shown). The system may also automatically identify table 126 as belonging to a predetermined semantic category. Exemplary predetermined semantic categories may include 2D surfaces such as a table top, a counter top, a wall, a window, a door, a floor, etc. as well as 3D surfaces or shapes such as a table, a bookshelf, a chair, a stool, a couch, a counter, etc. Thus, device 104 can determine mask information which indicates the background pixels corresponding to the selected region behind the physical object(s) (e.g., physical object 122) as well as the value associated with each background pixel.

Device 104 can send image 136 (with the user-created annotations and mask information) to device 108. Device 108 can receive image 136 (with the user-created annotations and mask information). As described above, annotated image 136 can include multiple marked vertices which are associated with 3D coordinates in the 3D world coordinate frame. Device 108 can store image 136 with the user-created annotations and the mask information (function 162), where image 136 is captured from the first viewpoint at location 130. Device 108 can return to device 104 an image with the initial mask 144, which can be displayed on device 104.

Device 108 can update and store image 136 with a new mask based on a user command (not shown) or a system configuration (function 164). That is, device 108 can replace the background pixels indicated by the identified mask by updating the value of each background pixel with a value different than the original value. This "different" or "updated" value for each background pixel can correspond to, e.g., a natural image, a randomly generated value, a random Gaussian noise value, and a same or differing value for each updated background pixel. Device 108 can return to device 104 images with the new mask 156, which can be displayed on device 104.

User 106 can subsequently use device 104 from other locations (e.g., locations 140 and 142) to capture (via, e.g., functions 144 and 146) images 148/150 of physical object 122 in scene 120, and send images 148/150 to device 108. In one embodiment, scene feature changes 160 associated with images 148/150 can differ based on location (including pose, distance, and angle of view from different locations 140 and 142). For example, user 106 can take a video by walking around physical object 122 in scene 120, where multiple frames of the video can correspond to images 148/150. In another embodiment, scene characteristic changes 160 associated with images 148/150 may differ based on a changed lighting, occlusion, or blur condition in conjunction with a same or different location (not shown).

Device 104 or device 108 (upon receiving images 148/150) can perform an algorithm to project the marked vertices from image 136 onto images 148/150, which can be displayed on device 104. Projecting 2D labels onto images of a physical object in a scene based on user-annotated 3D labels anchored in a world frame is described in U.S. Pat. Nos. 10,699,165 and 11,200,457. The projected labels and annotations can be projected and viewed as display AR data 198.

Device 108 can store images 148/150 with the varying features, including the projected 2D annotations and the mask information (function 170), where images 148/150 are captured from second viewpoints at locations 140 and 142. Device 108 can return to device 104 images with the initial mask 144, which can be displayed on device 104.

Device 108 can update and store images 148/150 (with the varying features) with a new mask (function 172), e.g., based on a user command (not shown) or a system configuration, similar to function 164 described above for image 136. Device 108 can return to device 104 images with the new mask 156, which can be displayed on device 104.

Device 108 can store, as a "collection of data," "collected data," or a "collected dataset," training data 190, which can include images 136, 148/150, and 156. In some embodiments, device 108 stores only images 144 or 156 with the auto-generated 2D annotations and identified masks, and does not separately store the initially capture images 148/150.

Device 108 can also train a machine model using the collected data as labeled training data (function 176). Device 108 can initiate the training of the machine model based on collecting or obtaining a certain amount of labeled training data (e.g., upon reaching a certain predetermined threshold). Device 108 can also initiate the training of the machine model in response to receiving a command from user 106, such as a user command 174.

Device 108 can thus store certain data as described above, including: a world coordinate frame 180, which corresponds to scene 120 and describes an environment that includes physical object 122 with background 126; image 136 (with user-created annotations and initial mask information); images 148/150 (with varying features); images 156 (with auto-created 2D annotations and new mask information); initial mask information 182; and new mask information 184.

Exemplary Scenes with Marked 3D Annotations and Projected 2D Annotations

Figure 2A:
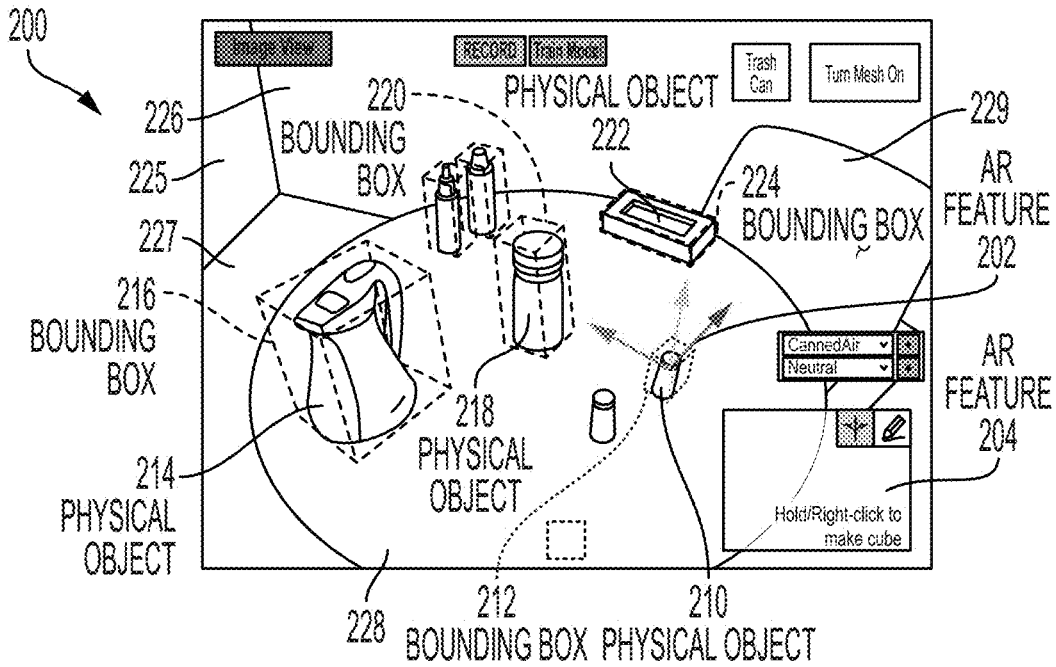
FIG. 2A illustrates a scene as viewed from a first viewpoint via a display of an AR device, including marked annotations placed over several objects indicating their location in the scene, in accordance with an embodiment of the present invention.

FIG. 2A illustrates a scene as viewed from a first viewpoint via a display 200 of an AR device, including marked annotations placed over several objects indicating their location in the scene, in accordance with an embodiment of the present invention. Using the AR device or other recording device, a user can capture a 3D mesh of the scene with physical objects (as depicted in U.S. Pat. Nos. 10,699,165 and 11,200,457) from a first viewpoint via display 200. The scene of display 200 can include physical objects (e.g., 210, 214, 218, and 222) and 2D/3D regions or areas which may be identified as a background (e.g., walls 225/226, a floor 227, a table 228, and a chair 229).

The user can annotate objects in a live view of the scene on the recording device. The user can place the annotations for an object using a set of tools on the recording device. The tools can indicate information about the physical object, including: a name or class of the object (e.g., "Tea Kettle"); a state of the object (e.g., "Open," "Closed," or "Neutral"); and a location of the object (e.g., by drawing a 3D bounding box around the object using AR features of the device). Exemplary annotation tools are described in U.S. Pat. Nos. 10,699,165 and 11,200,457 and can include: drawing a 2D or 3D bounding box or area around the object; drawing a free-hand polygon around the object using a manual "paint" or "draw" feature; using a virtual paint tool which allows the user to color the object; and placing multiple vertices along the boundaries of the object to define a bounding area for the object.

For example, the physical objects in the scene in display 200 can include: physical object 210 ("Salt Shaker"); physical object 214 ("Tea Kettle"); physical object 218 ("Creamer"); and physical object 222 ("Tissue Box"). Display 300 can include labeling tools or AR tools or feature. For example, an AR tool or feature 202 can indicate how to create a bounding box, e.g., by using natural 3D handles controlled by figure gestures such as translate, rotate, and scale or by dragging certain colored arrows corresponding to the each of the 3D axis (xyz) in a particular direction to change a size of the bounding box. Some annotation tools allow the user to place vertices along the boundaries of objects which can be used to define the bounding area associated with the object. When a physical object has been bounded or "localized," the user can use an AR tool or feature 204 to provide a label description of the object (e.g., "Salt Shaker," "Tea Kettle," "Creamer," "Tissue Box," etc.) as well as a state (e.g., "Neutral," "Off," "On," "Open," "Closed," etc.).

Thus, the user can use the labeling tools or AR features to mark annotations for a physical object, e.g., by using AR feature 202 to draw 3D bounding boxes 212, 216, 220, and 224 around, respectively, physical objects 210, 214, 218, and 222, and by using AR feature 204 to set the class and state for physical objects 210, 214, 218, and 222 (as depicted below in relation to FIG. 2B). The user-defined annotations may be included as part of the metadata captured by the recording device.

Display 200 can also include several settings, actions, commands, or controls which can be activated or de-activated by the user, to perform various actions, e.g.: turning the display of labels on/off; turning the mesh on/off; an uploading data; initiating training of a model; freezing/unfreezing the mesh; and saving the AR world map. The user may freeze the mesh in order to annotate an object and upload the corresponding image. The user may unfreeze the mesh when they are ready to move to a different view of the scene in the 3D world map.

In some embodiments, display 200 can include: an annotations list which can display all annotations placed in the mesh in a list or other format; a record widget which when activated can capture one or more images (while the mesh is frozen or unfrozen); and a light level indicator which can display a number corresponding to an amount of light visible or detected by the recording device in real time.

Figure 2B:
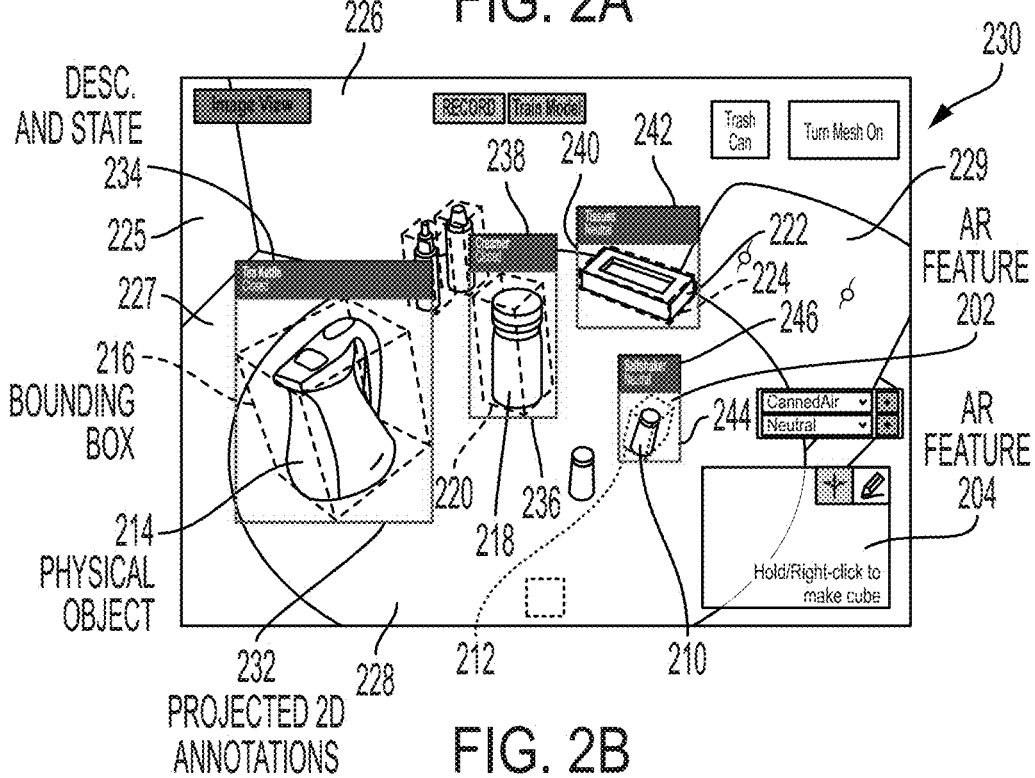
FIG. 2B illustrates a scene as viewed from the first viewpoint via the AR device display, including projected 2D annotations corresponding to the marked annotations in FIG. 2A, in accordance with an embodiment of the present invention.

FIG. 2B illustrates a scene as viewed from the first viewpoint via the AR device display 230, including projected 2D annotations corresponding to the marked annotations in FIG. 2A, in accordance with an embodiment of the present invention. Display 230 depicts the physical objects of FIG. 2A with both the user-provided labels (e.g., description and state, indicated with a blue label) and the corresponding projected 2D annotations (indicated with a red 2D bounding frame). For example: physical object 210 is depicted with its corresponding projected 2D annotations 244 and a description and state 246 of {Salt Shaker, Neutral}; physical object 214 is depicted with its corresponding projected 2D annotations 232 and a description and state 234 of {Tea Kettle, Closed}; physical object 218 is depicted with its corresponding projected 2D annotations 236 and a description and state 238 of {Creamer, Closed}; and physical object 222 is depicted with its corresponding projected 2D annotations 240 and a description and state 242 of {Tissue Box, Neutral}.

Exemplary Scenes with Background Mask as Virtual Green Screen

Figure 3A:
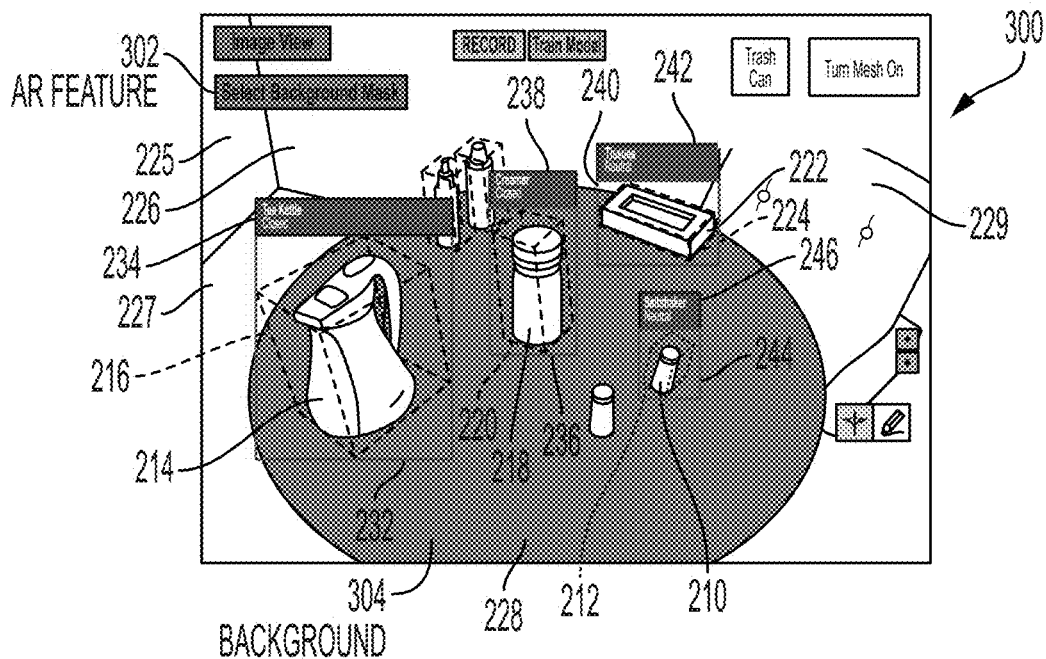
FIG. 3A illustrates the scene of FIG. 2B via the AR device display, including a background mask selected as the entirety of a table behind the physical object(s) and displayed in green, in accordance with an embodiment of the present invention.

FIG. 3A illustrates the scene of FIG. 2B via AR device display 300, including a background mask selected as the entirety of a table behind the physical object(s) and displayed in green, in accordance with an embodiment of the present invention. Display 300 can include an additional AR feature 302 labeled as "Select Background Mask," which when activated by the user allows the user to select background pixels corresponding to a region behind a given physical object or objects and associated each background pixel with a value. For example, using AR feature 302, the user can select the entirety of the table surface as a background 304 and set the color, pattern, mask, or value of background 304 to a virtual green screen, i.e., to a chroma key value corresponding to a shade of green commonly used to indicate a green screen. Other values which can be used to set the background pixels for the initial mask can include: a chroma key value; a red green blue (RGB) value (e.g., 0, 177, 64); a hue saturation value (HSV) value; a hue saturation brightness (HSB) value (e.g., a hue of 120 degrees, a saturation of 98 percent, and a brightness value of 96 percent); a monochrome value; a random value; a noisy value; and a value or flag indicating that a respective background pixel of the mask is to be subsequently replaced by a pixel with a different value.

Figure 3B:
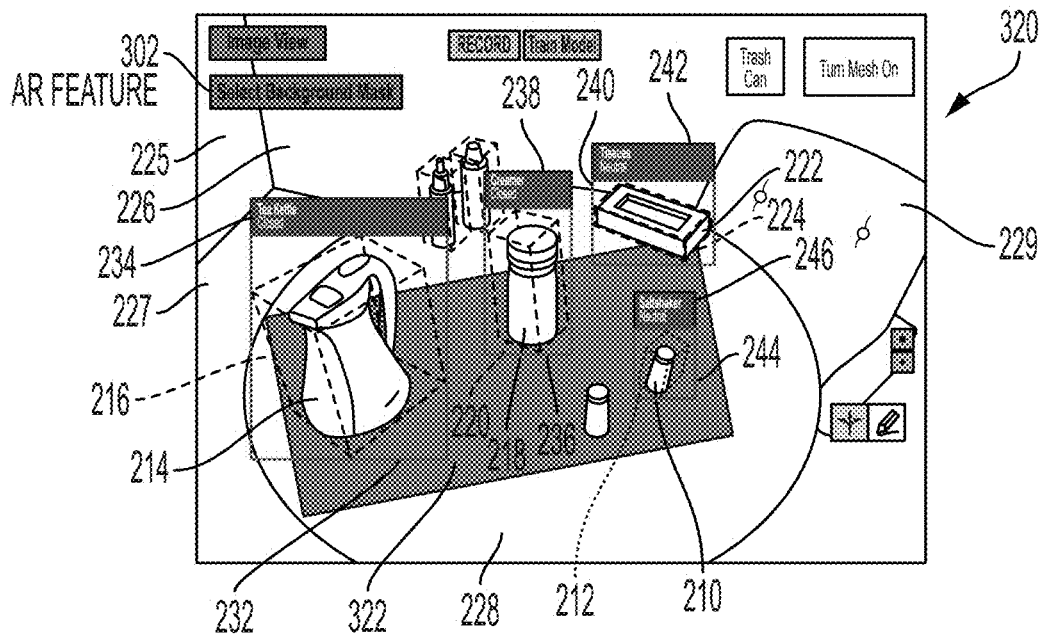
FIG. 3B illustrates the scene of FIG. 2B via the AR device display, including a background mask selected as a two-dimensional (2D) rectangular region behind the physical object(s) and displayed in green, in accordance with an embodiment of the present invention.

FIG. 3B illustrates the scene of FIG. 2B via AR device display 320, including a background mask selected as a two-dimensional (2D) rectangular region behind the physical object(s) and displayed in green, in accordance with an embodiment of the present invention. Using AR feature 302, the user can select a portion of the table surface as a background 322 and set the color, pattern, mask, or value of the background pixels of background 322 to any of the above-described values. In display 320, background 322 is depicted as occurring entirely behind physical object 210 and partially behind physical objects 214 and 218, but may be selected or identified as occurring behind all, some, or any combination of the physical objects on the table.

Exemplary Scenes with Updated or Replaced Background Mask

Figure 4A:
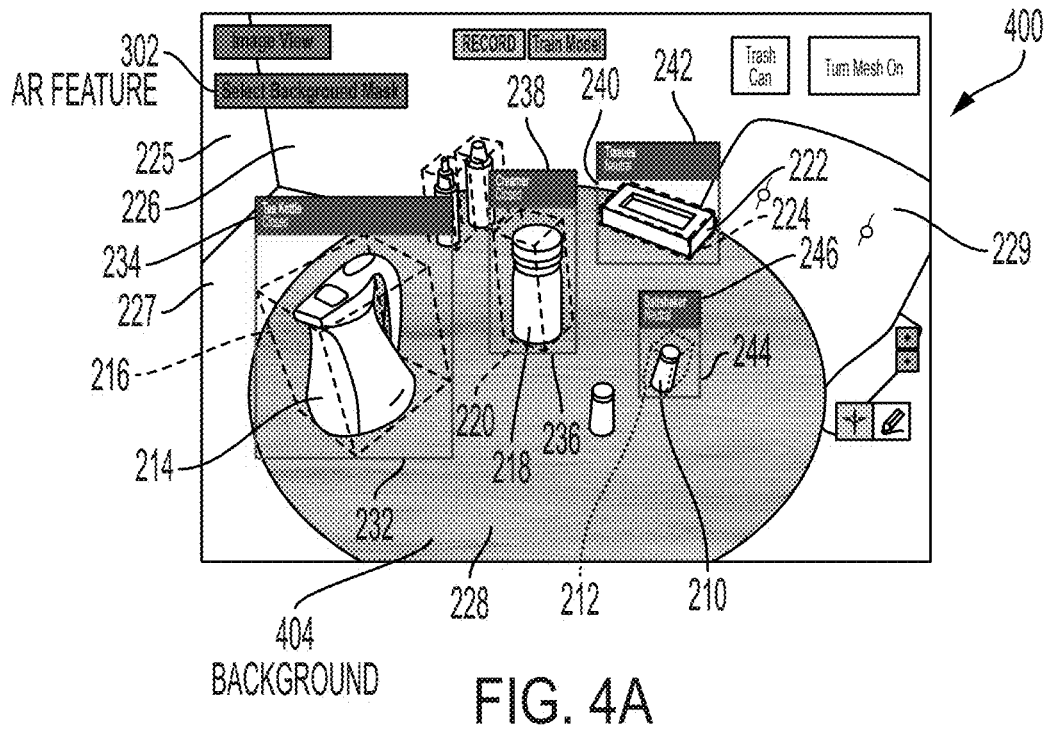
FIG. 4A illustrates the scene of FIG. 3A via the AR device display, including the background mask replaced with a different value or pattern (e.g., as a wood-grained texture), in accordance with an embodiment of the present invention.

FIG. 4A illustrates the scene of FIG. 3A via AR device display 400, including the background mask replaced with a different value or pattern (e.g., as a wood-grained texture), in accordance with an embodiment of the present invention. Display 400 depicts that the entire table, previously identified as background 304 in FIG. 3A, has been replaced with a background 404, which is a mask with updated values for each of the background pixels. Background 404 corresponds to a natural image of a pattern of a desk with a wood-grained surface. Background 404 can include any combination of similar or differing values for the background pixels, as described above for the mask for background 304.

Figure 4B:
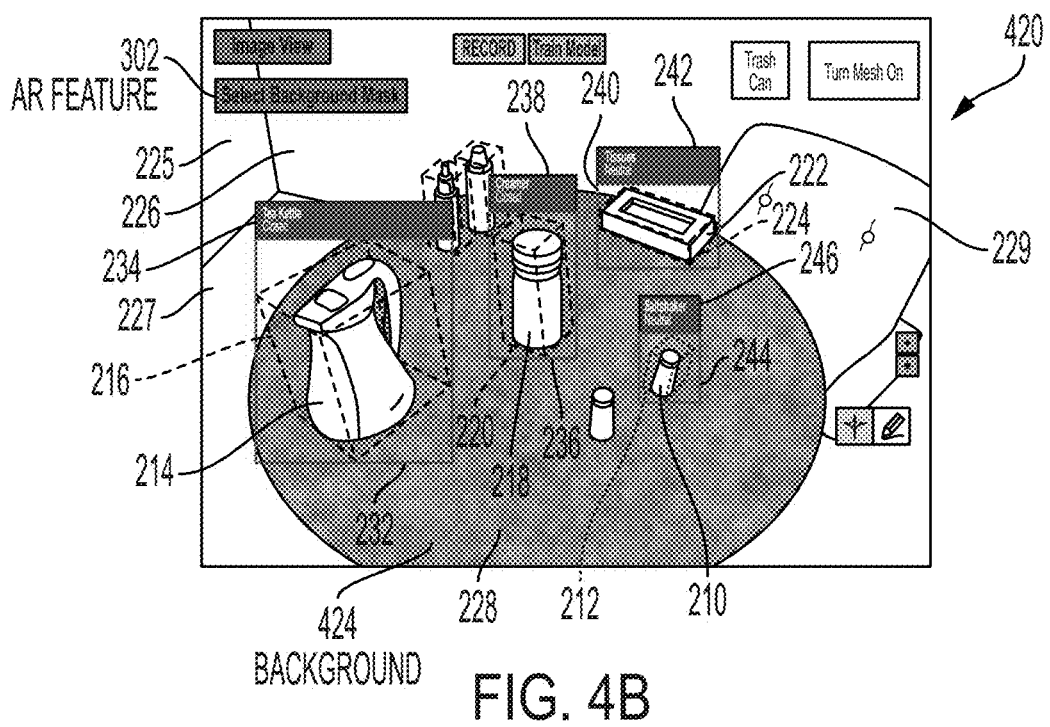
FIG. 4B illustrates the scene of FIG. 3A via the AR device display, including the background mask replaced with a different value or pattern (e.g., as a random Gaussian noise pattern), in accordance with an embodiment of the present invention.

FIG. 4B illustrates the scene of FIG. 3A via AR device display 420, including the background mask replaced with a different value or pattern (e.g., as a random Gaussian noise pattern), in accordance with an embodiment of the present invention. Display 420 depicts that the entire table, previously identified as background 304 in FIG. 3A, has been replaced with a background 424, which is a mask with updated values for each of the background pixels. Background 424 corresponds to random Gaussian noise pattern. As with background 404, background 424 can include any combination of similar or differing values for the background pixels, as described above for the mask for background 304.

While FIGS. 2A, 2B, 3A, 3B, 4A, and 4B depict table 228 as identified or selected as the background, the system (or user) may select any region as a background, including a region associated with a predetermined semantic category (e.g., walls 225, floor 227, and chair 229).

Figure 5A:
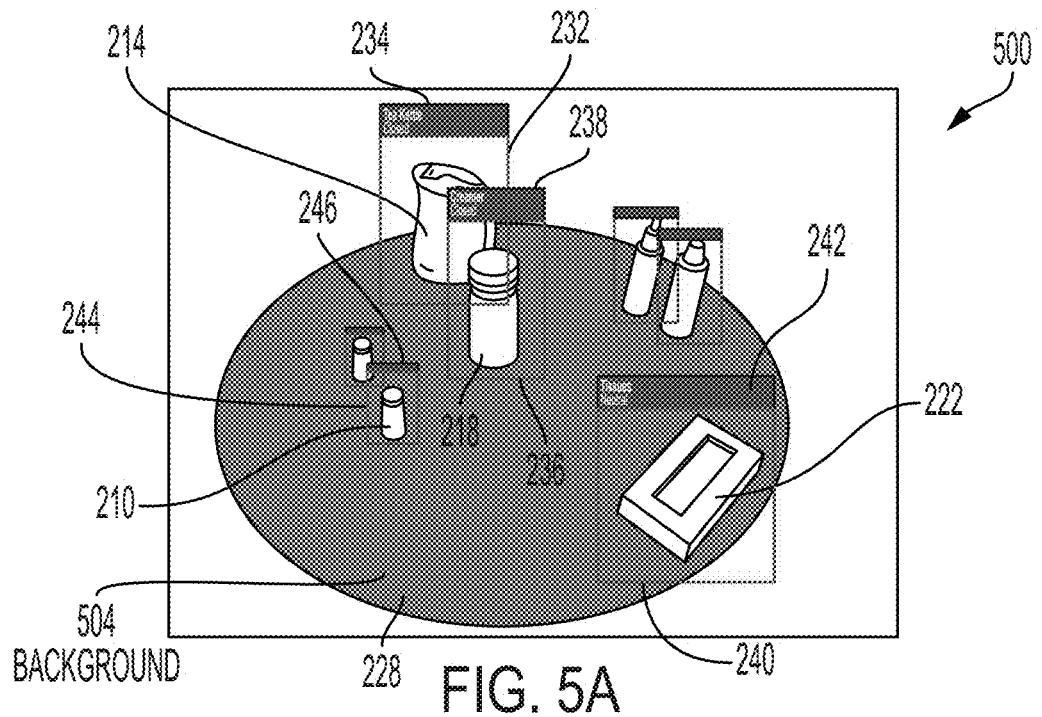
FIG. 5A illustrates a simplified view of the scene of FIG. 3A via the AR device display from a second viewpoint, including the background mask displayed as the entirety of the table behind the physical object(s) displayed in green, in accordance with an embodiment of the present invention.

Exemplary Scenes from Different Viewpoints with Background Mask as Virtual Green Screen and with Replaced Background Mask FIG. 5A illustrates a simplified view of the scene of FIG. 3A via the AR device display 500 from a second viewpoint, including the background mask displayed as the entirety of the table behind the physical object(s) displayed in green, in accordance with an embodiment of the present invention. Display 500 depicts the physical objects of FIG. 3A with both the user-provided labels (e.g., description and state, indicated with a blue label) and the corresponding projected 2D annotations (indicated with a red 2D bounding frame) from the second viewpoint, i.e., a viewpoint or location of the AR device which is different from the first viewpoint of the AR device as used in FIGS. 2A, 2B, 3A, 3B, 4A, and 4B. For example: physical object 210 is depicted with its corresponding projected 2D annotations 244 and a description and state 246 of {Salt Shaker, Neutral}; physical object 214 is depicted with its corresponding projected 2D annotations 232 and a description and state 234 of {Tea Kettle, Closed}; physical object 218 is depicted with its corresponding projected 2D annotations 236 and a description and state 238 of {Creamer, Closed}; and physical object 222 is depicted with its corresponding projected 2D annotations 240 and a description and state 242 of {Tissue Box, Neutral}.

Display 500 also automatically depicts the surface of the table from the second viewpoint as a background 504, where the entirety of the table surface (i.e., all the background pixels of the mask indicated by background 504) is depicted as a virtual green screen.

Figure 5B:
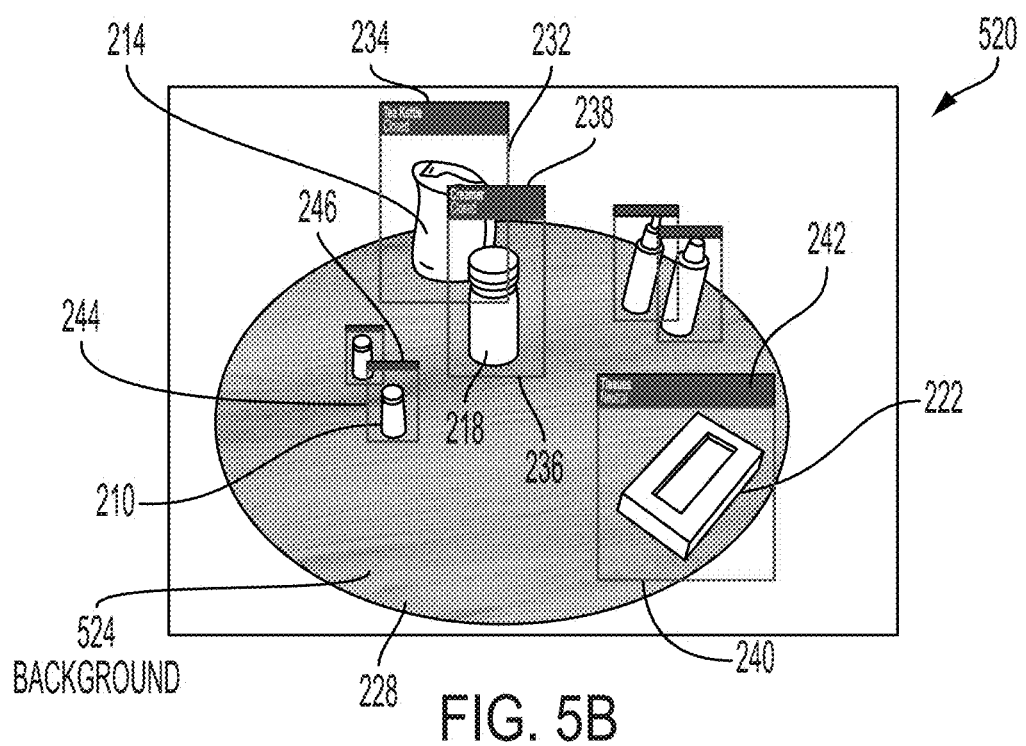
FIG. 5B illustrates the simplified view of the scene of FIG. 5A via the AR device display from the second viewpoint, including the background mask replaced with a different value or pattern, in accordance with an embodiment of the present invention.

FIG. 5B illustrates the simplified view of the scene of FIG. 5A via the AR device display 520 from the second viewpoint, including the background mask replaced with a different value or pattern, in accordance with an embodiment of the present invention. Similar to display 500, display 520 automatically depicts the surface of the table from the second viewpoint as a background 524, where the entirety of the table surface (i.e., all the background pixels of the mask indicated by background 504) is depicted as a different background (e.g., a different fill pattern such as a wood-grained texture).

Subsequent to placing the desired annotations (as in FIGS. 2A and 2B), identifying the mask (as in FIGS. 3A and 3B), replacing the mask (as in FIGS. 4A and 4B), and obtaining additional images from different viewpoints with the projected annotations and masks (as in FIGS. 5A and 5B), the system can reach a threshold for diversity and/or number of images collected for a training dataset (as described in U.S. patent application Ser. No. 17/840,358). Using the collected labeled dataset, the user or a system can train a machine model (e.g., a computer vision system). The trained machine model may also be used for future object detection purposes, as described in U.S. patent application Ser. No. 17/840,358, U.S. Pat. Nos. 10,699,165, and 11,200, 457.

The projected annotations of FIGS. 2B, 3A, 3B, 4A, 4B, 5A, and 5B and the instant embodiments can be based on recording the coordinates of bounding boxes in the common 3D world frame (as in FIG. 2A), which allows the system to know where the bounding boxes appear relative to the recording device at all times. Because the 3D mesh is saved along with marked annotations during any and all collection sessions, the system can accumulate data from multiple runs or passes. As described above, the user can explicitly provide a label including a description and a state of an object while annotating an object. The user can also explicitly provide other metadata, such as a lighting condition, occlusion information, and blur information, or that metadata may be captured or provided by the recording device.

Figure 6:
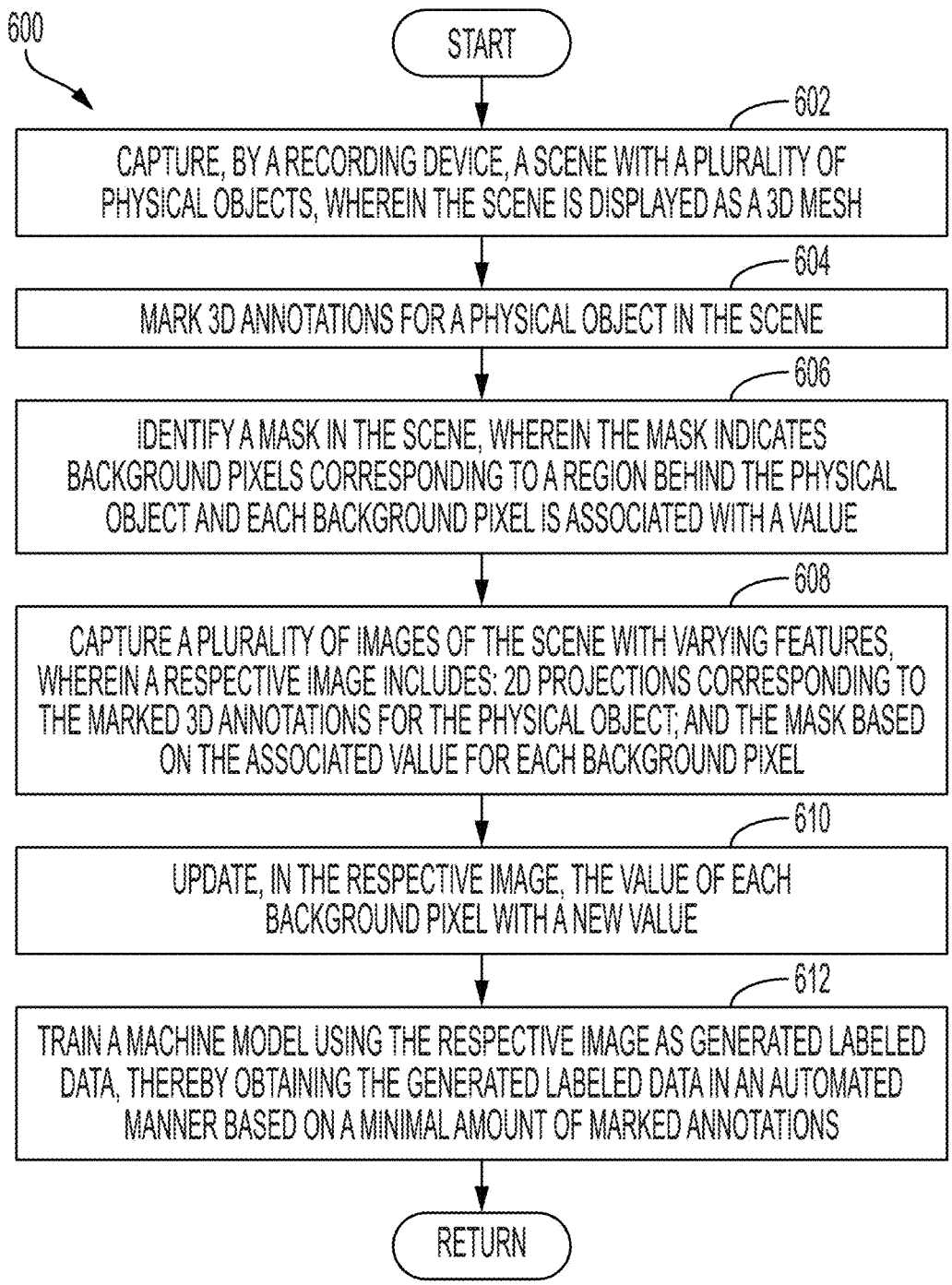
FIG. 6 illustrates a flowchart illustrating a method for facilitating generation of background replacement masks for improved labeled image dataset collection, in accordance with an embodiment of the present invention.

Method for Mixing Static Scene and Live Annotations for Labeled Dataset Collection FIG. 6 illustrates a flowchart illustrating a method for facilitating generation of background replacement masks for improved labeled image dataset collection, in accordance with an embodiment of the present invention. During operation, the system captures, by a recording device, a scene with a plurality of physical objects, wherein the scene is displayed as a three-dimensional (3D) mesh (operation 602). The system (or a user) marks 3D annotations for a physical object in the scene (operation 604). The system (or a user) identifies a mask in the scene, wherein the mask indicates background pixels corresponding to a region behind the physical object and each background pixel is associated with a value (operation 606). The system captures a plurality of images of the scene with varying features, wherein a respective image includes: two-dimensional (2D) projections corresponding to the marked 3D annotations for the physical object;

and the mask based on the associated value for each background pixel (operation 608). The system updates, in the respective image, the value of each background pixel with a new value (operation 610). The system trains a machine model using the respective image as generated labeled data, thereby obtaining the generated labeled data in an automated manner based on a minimal amount of marked annotations (operation 612). The operation returns.

Thus, the embodiments described herein provide a system which increases the efficiency of collecting labeled training data for machine learning (e.g., computer vision systems) by providing an automated (i.e., system-configured) or user-configured mechanism to identify a background mask and generate background replacement masks in a significant number of images or frames captured by a user, e.g., in a video. The described embodiments leverage the automatically projected 2D annotations and mechanisms described in U.S. Pat. Nos. 10,699,165 and 11,200,457 to provide a further improvement to the process of collecting a labeled image dataset for machine learning, i.e., to train a machine model or a computer vision system such as an object detection system. The improvement described herein can result in an increased efficiency, including a significant reduction in the amount of manual labeling required to annotate images, including multiple regions or objects of interest in the images, which can result in an improvement in the technological fields of machine learning and computer vision systems.

Improvements to Existing Technologies

Some common forms of augmented reality (AR) in the service industry include a tethered telepresence, a visual retrieval of information, and a repair script with overlays. However, each of these results is hindered by inefficiencies. In a tethered telepresence, a remote technician may need to perform a visual inspection, which can require both connectivity and extensive human expert time. In a visual retrieval of information (e.g., the Digital Glove Box application), a camera may retrieve a model number, manual pages, or telemetry statistics. However, the output is a passive page and may be limited to a single room. In a repair script with overlays, a checklist or procedural prompt may be overlaid on a user's view, and the user can click through the overlaid view. However, the view may be expensive to create and is still mostly passive, in that the view is not able to understand the user's actions. Thus, producing stand-alone AR content currently requires extensive work (e.g., by artists, human experts, and machine learning experts) to create images and video (e.g., animation) to train a model, which can result in an inefficient system.

The embodiments described herein provide a system which increases the efficiency of collecting training data for machine learning by providing an AR-based mechanism for multiple users to annotate objects in a shared 3D mesh or AR world map (e.g., automatically identifying and replacing background masks). In addition to decreasing the amount of human time and labor required to collect training data, the system can also decrease the development time of new object detection systems. Beyond bounding box coordinates, the ground truth annotation can also capture 3D information about the object location, orientation, and pose from the recording device. The collected data can thus be used for a wider set of computer vision problems, e.g., estimation of pose, depth, size, object class, and properties such as "rough" vs. "smooth."

Furthermore, embodiments of the system can quickly create large labeled datasets of parts of systems managed by customers and use the labeled datasets to train computer vision systems. A trained system can assist service technicians with management and repair of a part of a system and can also allow a customer to assist an end-user with repair of a system part. A differentiator between these existing tools and the proposed technology is the large amount of time needed to collect the training data for the computer vision systems encased within the existing tools. This large amount of time can be reduced to a tiny fraction (e.g., $\frac{1}{10}$ or less) by using the embodiments of the system to efficiently collect training data using the described mechanism.

Other exemplary systems managed by customers can include: cars or vehicles (where the dashboard or other car part, e.g., an engine or a feature in the cabin of the car, may be a region of interest for which the customer may require assistance); and printers or other devices (where a feeder tray, output tray, control panel, or other part may be the region of interest). A customer (or an end-user) who may require assistance can take a photo of the system with his cell phone, and obtain useful information about a certain "labeled" section of the photo. For example, if a user of a vehicle experiences an issue with the vehicle, the vehicle user can capture an image of the vehicle dashboard with his mobile device, and, based on the previously generated diverse set of labeled images of the dashboard from various camera poses under varying conditions and with varying auto-generated backgrounds, the vehicle user can obtain a labeled image that may be used to assist the user in understanding how to address the issue.

Thus, by providing a system which allows multiple users to continuously and dynamically label objects, update labels/annotations, and view marked annotations, while also identifying, generating, and updating background masks, the described embodiments facilitate a method and system which improve the efficient collection of a labeled image dataset for machine learned computer vision tasks. This can result in a significant reduction in the burden of labeling for training an effective computer vision system.

Exemplary Computer and Communication System

Figure 7:
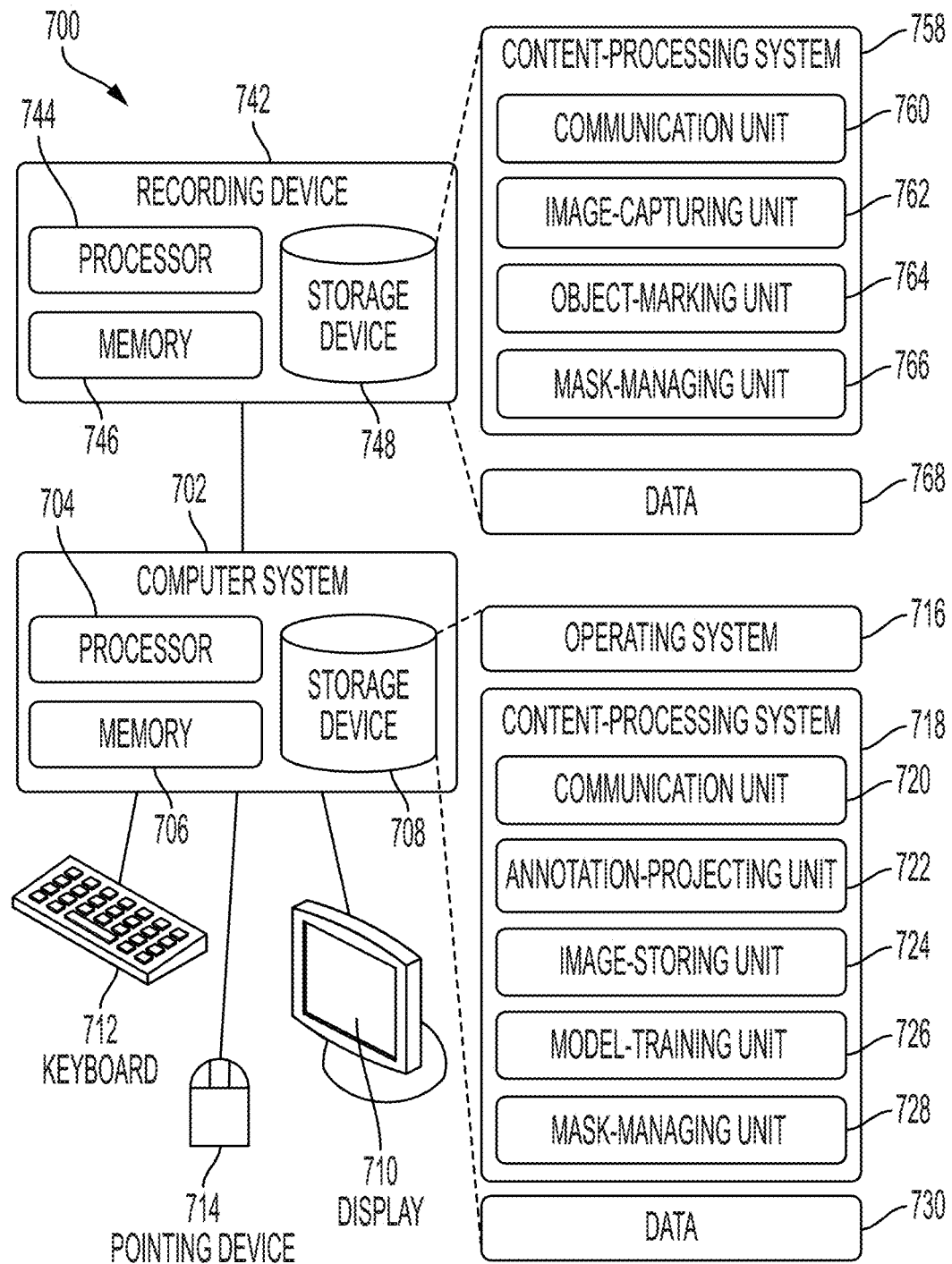
FIG. 7 illustrates an exemplary computer and communication system that facilitates generation of background replacement masks for improved labeled image dataset collection, in accordance with an embodiment of the present invention.

FIG. 7 illustrates an exemplary computer and communication system 700 that facilitates generation of background replacement masks for improved labeled image dataset collection, in accordance with an embodiment of the present invention. System 700 includes a computer system 702 and a recording device 742, which can communicate via a network (not shown). Computer system 702 can correspond to device 108 of FIG. 1. Recording device 742 can correspond to device 104 of FIG. 1.

Recording device 742 can include a processor 744, a memory 746, and a storage device 748. Memory 746 can include a volatile memory (e.g., RAM) that serves as a managed memory and can be used to store one or more memory pools. Storage device 748 can store a content-processing system 758 and data 768.

Content-processing system 758 can include instructions, which when executed by recording device 742, can cause recording device 742 to perform methods and/or processes described in this disclosure. Specifically, content-processing system 758 may include instructions for sending and/or receiving/obtaining data packets to/from other network nodes across a computer network (communication unit 760). A data packet can include an image, a video, a 3D mesh, data corresponding to annotations, 3D coordinates of a vertex, 2D projections, information about a scene or a physical object in the scene, a command, and information associated with a mask.

Content-processing system 758 can additionally include instructions for capturing a scene with a plurality of physical objects, wherein the scene is displayed as a three-dimensional (3D) mesh (image-capturing unit 762). Content-processing system 758 can include instructions for marking 3D annotations for a physical object in the scene (object-marking unit 764). Content-processing system 758 can include instructions for identifying a mask in the scene, wherein the mask indicates background pixels corresponding to a region behind the physical object and each background pixel is associated with a value (mask-managing unit 766). Content-processing system 758 can also include instructions for capturing a plurality of images of the scene with varying features (image-capturing unit 762). Content-processing system 758 can include instructions for updating, in the respective image, the value of each background pixel with a new value (mask-managing unit 766).

Computer system 702 can include a processor 704, a memory 706, and a storage device 708. Memory 706 can include a volatile memory (e.g., RAM) that serves as a managed memory and can be used to store one or more memory pools. Furthermore, computer system 702 can be coupled to a display device 710, a keyboard 712, and a pointing device 714. Storage device 708 can store an operating system 716, a content-processing system 718, and data 730.

Content-processing system 718 can include instructions, which when executed by computer system 702, can cause computer system 702 to perform methods and/or processes described in this disclosure. Specifically, content-processing system 718 may include instructions for sending and/or receiving/obtaining data packets to/from other network nodes across a computer network (communication unit 720), such as the data packets described above in relation to communication unit 760.

Content-processing system 718 can further include instructions for projecting 2D annotations corresponding to marked 3D annotations for a physical object (annotation-projecting unit 722). Content-processing system 718 can include instructions for identifying a mask in the scene, wherein the mask indicates background pixels corresponding to a region behind the physical object and each background pixel is associated with a value (mask-managing unit 728), e.g., using predetermined semantic categories. Content-processing system 718 can include instructions for obtaining and storing: an image of the scene, including the marked 3D annotations and the identified mask, captured by recording device 742; the respective image, including the 2D projections and the mask, captured by recording device 742; and the respective image with the updated background pixels (image-storing unit 724). Content-processing system 718 can include instructions for training a machine model using the respective image as generated labeled data, thereby obtaining the generated labeled data in an automated manner based on a minimal amount of marked annotations (model-training unit 726).

Data 730 and 768 can include any data that is required as input or that is generated as output by the methods and/or processes described in this disclosure. Specifically, data 730 and 768 can include at least: data; collected data; an image; an image of a physical object; a collection of training data; a trained network; an image with user-created annotations; an image with system-created or automatically generated or projected annotations; a 3D mesh; a 3D world coordinate frame; an AR world map; a vertex; 3D coordinates for a vertex; a scene; a characteristic or feature of the scene; an indicator of a mask comprising background pixels corresponding to a region behind a physical object; marked vertices; a projection of the marked vertices; projected 2D or 3D annotations; a class and a state associated with an object; an indicator or identifier of a recording device or a computing device; additional images of a scene; a distance and angle between a recording device and a physical object; a lighting condition associated an image; a percentage of occlusion of a physical object in an image; an amount of blur associated with an image; a class or a state of a physical object in an image; a model; an annotation; metadata; user-supplied information; device-determined information; a request; a command; a test set of images; a training set of images; and an output of a trained model.

Figure 8:
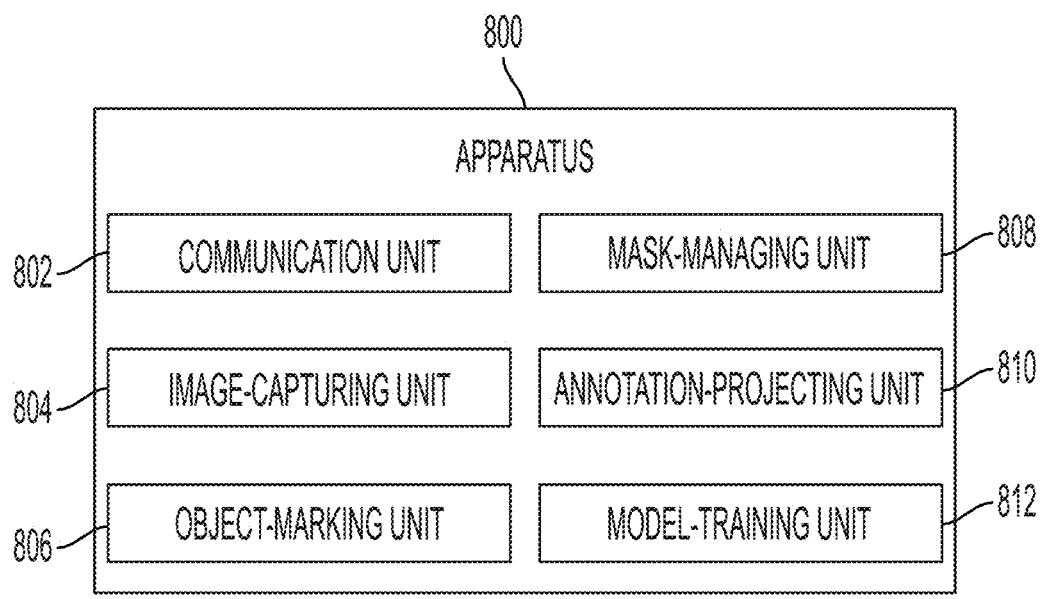
FIG. 8 illustrates an exemplary apparatus that facilitates generation of background replacement masks for improved labeled image dataset collection, in accordance with an embodiment of the present application.

FIG. 8 illustrates an exemplary apparatus 800 that facilitates generation of background replacement masks for improved labeled image dataset collection, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device or devices capable of communicating with other computer systems and/or devices. Specifically, apparatus 800 can comprise units 802-812 which perform functions or operations similar to units 760-766 of recording device 742 and unit 720-728 of computer system 702 of FIG. 7, including: a communication unit 802; an image-capturing unit 804; an object-marking unit 806; a mask-managing unit 808; an annotation-projecting unit 810; and a model-training unit 812.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
capturing, by a recording device, a scene with a plurality of physical objects, wherein the scene is displayed as a three-dimensional (3D) mesh;
marking 3D annotations for a physical object in the scene;
identifying a background mask in the scene displayed as a 3D mesh, wherein the background mask indicates pixels corresponding to a region behind or partially obstructed by the physical object and each pixel in the identified background mask is associated with a value;
capturing a plurality of images of the scene with varying features, wherein a respective image includes:
two-dimensional (2D) projections corresponding to the marked 3D annotations for the physical object; and
the background mask based on the associated value for each pixel in the background mask;
updating, in the respective image, the value of each pixel in the identified background mask with a new value; and
training a machine model using the respective image as generated labeled data, thereby obtaining the generated labeled data in an automated manner based on a minimal amount of marked annotations.

2. The method of claim 1, wherein identifying the background mask further comprises at least one of:
inserting, by a user associated with the recording device, the background mask in the scene using tools associated with the recording device or another computing device; and
detecting, automatically by the recording device, predetermined categories of 2D surfaces or 3D surfaces or shapes.

3. The method of claim 1,
wherein the background mask comprises a virtual green screen, and
wherein the value associated with each background pixel comprises a chroma key value corresponding to a shade of green.

4. The method of claim 1, wherein the background mask corresponds to at least one of:
a 2D surface within the 3D mesh scene that is behind or underneath the physical object relative to the recording device; and
a 3D surface or shape within the 3D mesh scene that is behind or underneath the physical object relative to the recording device.

5. The method of claim 1, wherein the varying features of the captured plurality of images of the scene include or are based on at least one of:
a location, pose, or angle of the recording device relative to the physical object;
a lighting condition associated with the scene; and
an occlusion factor of the physical object in the scene.

6. The method of claim 1, wherein the value associated with each background pixel comprises at least one of:
a chroma key value;
a red green blue (RGB) value;
a hue saturation value (HSV) value;
a hue saturation brightness (HSB) value;
a monochrome value;
a random value;
a noisy value; and
a value or flag indicating that a respective background pixel of the background mask is to be subsequently replaced by a pixel with a different value.

7. The method of claim 1,
wherein a respective background pixel is of a same or a different value than a remainder of the background pixels.

8. The method of claim 1, wherein updating the value of each background pixel with the new value comprises at least one of:
replacing the background pixels indicated by the background mask with a natural image, wherein the natural image comprises a differing texture from the region behind the physical object; and
replacing the background pixels indicated by the background mask with pixels of a same value or a different value as each other.

9. The method of claim 1, further comprising:
storing an image of the scene, including the marked 3D annotations and the identified background mask, captured by the recording device;
storing the respective image, including the 2D projections and the background mask, captured by the recording device; and
storing the respective image with the updated background pixels.

10. A computer system, comprising:
a processor; and
a storage device storing instructions that when executed by the processor cause the processor to perform a method, the method comprising:
capturing, by a recording device, a scene with a plurality of physical objects, wherein the scene is displayed as a three-dimensional (3D) mesh;
marking 3D annotations for a physical object in the scene;
identifying a background mask in the scene displayed as a 3D mesh, wherein the background mask indicates pixels corresponding to a region behind or partially obscured by the physical object and each pixel in the identified background mask is associated with a value;
capturing a plurality of images of the scene with varying features, wherein a respective image includes:
two-dimensional (2D) projections corresponding to the marked 3D annotations for the physical object; and
the background mask based on the associated value for each background pixel;
updating, in the respective image, the value of each pixel in the identified background mask with a new value; and
training a machine model using the respective image as generated labeled data, thereby obtaining the generated labeled data in an automated manner based on a minimal amount of marked annotations.

11. The computer system of claim 10, wherein identifying the background mask further comprises at least one of:

inserting, by a user associated with the recording device, the background mask in the scene using tools associated with the recording device or another computing device; and detecting, automatically by the recording device, predetermined categories of 2D surfaces or 3D surfaces or shapes.

12. The computer system of claim 10,
wherein the background mask comprises a virtual green screen, and
wherein the value associated with each background pixel comprises a chroma key value corresponding to a shade of green.

13. The computer system of claim 10, wherein the background mask corresponds to at least one of:
a 2D surface within the 3D mesh scene that is behind or underneath the physical object relative to the recording device; and
a 3D surface or shape within the 3D mesh scene that is behind or underneath the physical object relative to the recording device.

14. The computer system of claim 10, wherein the varying features of the captured plurality of images of the scene include or are based on at least one of:
a location, pose, or angle of the recording device relative to the physical object;
a lighting condition associated with the scene; and
an occlusion factor of the physical object in the scene.

15. The computer system of claim 10, wherein the value associated with each background pixel comprises at least one of:
a chroma key value;
a red green blue (RGB) value;
a hue saturation value (HSV) value;
a hue saturation brightness (HSB) value;
a monochrome value;
a random value;
a noisy value; and
a value or flag indicating that a respective background pixel of the background mask is to be subsequently replaced by a pixel with a different value.

16. The computer system of claim 10, wherein updating the value of each background pixel with the new value comprises at least one of:
replacing the background pixels indicated by the background mask with a natural image, wherein the natural image comprises a differing texture from the region behind the physical object; and
replacing the background pixels indicated by the background mask with pixels of a same value or a different value as each other.

17. The computer system of claim 10, wherein the method further comprises:
storing an image of the scene, including the marked 3D annotations and the identified background mask, captured by the recording device;
storing the respective image, including the 2D projections and the background mask, captured by the recording device; and
storing the respective image with the updated background pixels.

18. A non-transitory computer-readable storage medium storing instructions that when executed by a computer cause the computer to perform a method, the method comprising:
capturing, by a recording device, a scene with a plurality of physical objects, wherein the scene is displayed as a three-dimensional (3D) mesh;
marking 3D annotations for a physical object in the scene;
identifying a background mask in the scene displayed as a 3D mesh, wherein the background mask indicates pixels corresponding to a region behind or partially obstructed by the physical object and each pixel in the identified background mask is associated with a value;
capturing a plurality of images of the scene with varying features, wherein a respective image includes:
two-dimensional (2D) projections corresponding to the marked 3D annotations for the physical object; and
the background mask based on the associated value for each background pixel;
updating, in the respective image, the value of each pixel in the identified background mask with a new value; and
training a machine model using the respective image as generated labeled data, thereby obtaining the generated labeled data in an automated manner based on a minimal amount of marked annotations.

19. The non-transitory computer-readable storage medium of claim 18, wherein identifying the background mask further comprises at least one of:
inserting, by a user associated with the recording device, the background mask in the scene using tools associated with the recording device or another computing device; and
detecting, automatically by the recording device, predetermined categories of 2D surfaces or 3D surfaces or shapes.

20. The non-transitory computer-readable storage medium of claim 18, wherein the background mask corresponds to at least one of:
a 2D surface within the 3D mesh scene that is behind or underneath the physical object relative to the recording device; and
a 3D surface or shape within the 3D mesh scene that is behind or underneath the physical object relative to the recording device, and
wherein updating the value of each background pixel with the new value comprises at least one of:
replacing the background pixels indicated by the background mask with a natural image, wherein the natural image comprises a differing texture from the region behind the physical object; and
replacing the background pixels indicated by the background mask with pixels of a same value or a different value as each other.

\* \* \* \* \*